(No Model.)
J. L. FURIAKOVICS.
APPARATUS FOR REGULATING THE SPEED OF TURBINES.
No. 506,220. Patented Oct. 10, 1893.
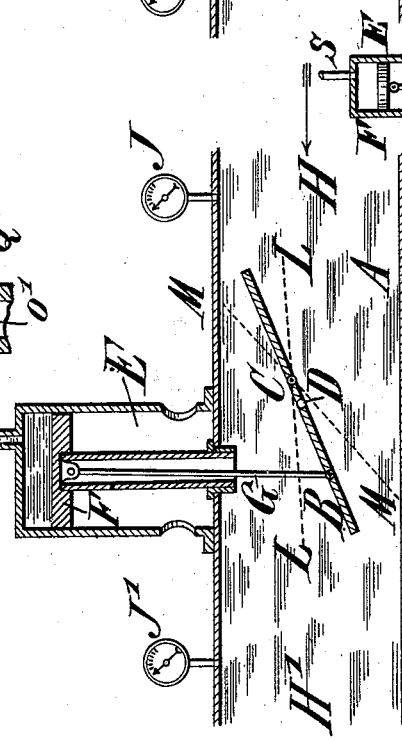
Fig. 1.
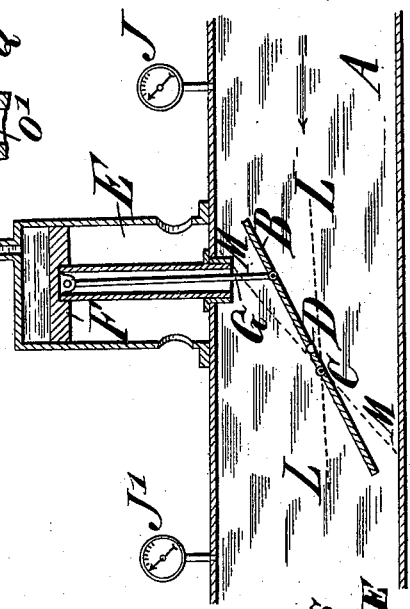
Fig. 2.
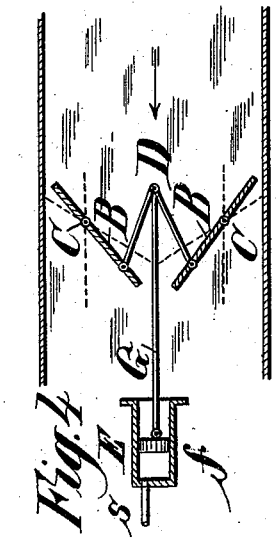
Fig. 3.
Fig. 4.
Witnesses:
H. G. Dieterich
B. W. Sommers
Inventor:
Johann L. Furiakovics,
by Henry Orth
Atty.

UNITED STATES PATENT OFFICE.

JOHANN LAURENZ FURIAKOVICS, OF BADEN, AUSTRIA-HUNGARY.

APPARATUS FOR REGULATING THE SPEED OF TURBINES.

SPECIFICATION forming part of Letters Patent No. 506,220, dated October 10, 1893.

Application filed April 18, 1892. Serial No. 429,607. (No model.)

*To all whom it may concern:*

Be it known that I, JOHANN LAURENZ FURIAKOVICS, engineer, a subject of the Emperor of Austria-Hungary, residing at Baden, in the Province of Lower Austria, in the Empire of Austria-Hungary, have invented certain new and useful Improvements in Apparatus for Regulating the Power and Speed of Turbines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has relation to appliances for regulating the speed of and power exerted by turbines, and has for its object the provision of means whereby this may not only be automatically effected by simple mechanical devices, but whereby the speed and power of a turbine may be accurately regulated.

To these ends the invention consists in the arrangement within the water conduit, whether open or closed, of one or more flap or throttle valves having its axis or their axes in a plane eccentric to the center of pressure in the conduit, and in combination therewith of means for controlling said valve or valves either by hand or automatically in such manner that the difference in the pressure on opposite sides of the valve or valves will always correspond to the required speed and power of the turbine, as will now be fully described reference being had to the accompanying drawings which illustrate my invention more or less diagrammatically, and in which—

Figures 1 and 2 are sectional views, a single valve being shown in the water conduit, and Figs. 3 and 4 are like views, a plurality of valves being shown in said conduit.

Referring to Figs. 1 and 2, A, indicates the water conduit, which may be a closed conduit as shown, or an open conduit, the direction of the flow of water being indicated by arrows.

B, is the valve, whose axis of rotation, C, is in a plane outside of the center of pressure, D, of the water in the conduit, so that the water pressure will always act upon the valve to open or close the same, and, as shown in said figures, the said axis of rotation of the valve may be located in front or in rear of the point of connection of the valve actuating rod, G, that is to say, said axis may be located down stream or up stream relatively to said rod, which is connected with a piston F, working in a cylinder, E, so that the movements of the piston will impart corresponding movements to the valve, B, within the angles, L, C, M, of which the points, L, M, indicate the extreme positions of the valve. The cylinder, E, is connected by a pipe, S, whose cross sectional area should be adjustable, with a piston cylinder, P, and the simplest means for adjusting said area is by the valve or cock, $n$. The cylinder, P, is provided with in and out-flow pipes, Q, Q', whose cross sectional areas should also be adjustable, to which end suitable cocks or valves may be provided and operated by hand, or said valves may be connected in a well-known manner so as to be simultaneously operated by hand, or the operating lever for the valves may be connected with a governor controlled by the turbines, which device I have deemed unnecessary to show as they come within the scope of a skilled mechanic. I prefer, however, to regulate the cross-sectional area by means of equilibrated twin pistons, $o$, and $o'$, which may either be operated by hand through the medium of their rod, T, or by preference through the medium of a governor, to the vertically movable sleeve of which said rod is connected. I have also deemed it unnecessary to illustrate the connection between the governor and piston rod, T, for the reason that any skilled mechanic will be able to make this connection. In this manner the pressure within the cylinder, P, and consequently the pressure upon the piston, F, in cylinder, E, can be varied, and as these varying pressures are transmitted through piston, F, to valve, B, the position of the latter will be correspondingly varied, and therethrough the pressure of the water in front thereof.

Assuming the pressure at, H, or in rear of the valve to be constant, it is evident that at every position of the valve B, within the limits, L, M, there will be a corresponding variation in the pressure at H', or in front of said valve, and in the case of a closed conduit these differential pressures may be indicated by pressure gages, J, and J', respectively, located in rear and front of said valve, while in the case of an open conduit, A, these differential pressures will be indicated by the difference in the water level at the respective points, H, and H'. The difference between these pressures is least when the valve, B, is in its extreme position, L, L, and greatest when in its opposite extreme position, M, M, and consequently the pressure exerted upon the piston, F, in order to hold the valve in one or the other position or in a position intermediate of these extreme positions, will have to be proportionate to these differential pressures. It follows that varying pressures on the piston, F, will result in corresponding variations in the pressure in front of the valve, B, or at H', because the center of rotation of said valve does not coincide with the center of pressure, D, of the water in conduit, A, so that the pressure at H, upon the valve will vary in proportion to the difference between the pressures at H and H'.

If water under pressure is admitted to the cylinder, P, through pipe, Q, and allowed to flow out through pipe, Q', and the cross sectional areas of these pipes is varied, the pressure in said cylinder, P, will be correspondingly varied, and these variations may be controlled by hand, as for instance in a manner similar to that of controlling the brake cylinder for steam or hydraulic hoisting engines, or automatically by connecting the rod, T, of the equilibrated twin piston, o, o', with the sleeve of a governor controlled by the turbine, as stated hereinbefore. These variable pressures in the cylinder, P, are transmitted through pipe, S, to the piston, F, in cylinder, E, so that when the pressure on F, above the same is greater than that exerted by the valve in an opposite direction, that is to say, when the difference between the pressures on opposite sides of the valve is less than the pressure of the water in cylinder, E, on piston, F, the said piston will move down, producing a correspondingly proportionate movement of the valve toward or to its limits of motion, M, M, the reverse taking place when the pressure below the piston, F, is in excess of the pressure above the same, the valve, B, then moving proportionately toward or to its limit of motion, L, L, said valve moving from L to M, or from M to L, until the pressures on the opposite faces of the piston, F, balance each other, as will be readily understood.

Assuming the pressure of the water admitted to the cylinder, P, through, Q, to be constant, there will be a definite pressure in said cylinder, as well as in cylinder, E, for every position of the piston, o, o', or for every position of the governor sleeve, and consequently a corresponding definite differential pressure at the points, H, and H'. Since the power exerted by and the speed of the turbine are controlled by the pressure at H', or at the outlet side of the valve, and since the pressure at the inlet side, H, may be considered as constant, it is obvious that by varying the pressure at the outlet side, H', the power exerted by and the speed of the turbine can be correspondingly varied, so that said power and speed can be regulated as may be required. If the area of the outlet of the conduit leading to the turbine is adjusted to the work to be performed by said turbine, then the governor sleeve and valve, B, will assume that position at which the difference between the pressures at the inlet and outlet sides of the valve will be least, and under these conditions the said valve may assume any position between its extremes, L, M, for the reason that for a given inlet area the difference in the pressure of the water on the inlet and outlet sides of the valve will depend upon the velocity of the water, while said velocity will depend upon the outlet area from the turbine. If the area of the outlet to the turbine is greater than necessary to the development of a given amount of power, that is to say, if the volume of water admitted to the turbine is too great, the speed of the latter is correspondingly increased and the governor sleeve is displaced, thereby moving the piston o and o', so as to correspondingly increase the pressure in cylinder, P, by more or less contracting the outlet, Q', and consequently in cylinder, E, to overcome the pressure of the water on the valve at the inlet side, H, whereby said piston, F, is caused to move downward moving the valve so as to increase the difference between the pressures at the inlet side, H, and outlet side, H', of said valve to correspondingly reduce the volume of and the power exerted by the water upon the turbine, to reduce its speed. It is obvious therefore that the outlet of the conduit, A, leading to the turbine may be fully opened while the turbine is running idle without causing any material increase in the speed thereof, provided the governor is sufficiently sensitive to the variations in the speed of the turbine.

Of course if it is desired to fully utilize a given supply of water or a portion thereof, the area of the outlet of the conduit, A, leading to the turbine should be adjusted so that the power of the water admitted to the latter at a normal pressure will result in the work to be performed, or the maximum work to be performed by the turbine, and this will be the case when the said turbine revolves at the required speed and the gages, J, and J', indicate nearly the same pressure, or in other words, when the difference between the pressures at the inlet and outlet sides of the valve, B, is least for a given number of revolutions of the turbine.

Instead of a single valve, B, two valves may be employed and the same results obtained, as shown in Figs. 3 and 4, said valves having their axes of rotation C, likewise in planes eccentric to or outside of the center of pressure, D, and the piston cylinder, E, may be located within the conduit, A, as shown in Fig. 4, the pipe, S, connecting the said cylinder with the cylinder, P, being carried out of the conduit, which arrangement is more especially applicable to open conduits.

The water supplied to piston cylinder, P, may be taken directly from the conduit, A, or it may be supplied thereto by means of a pump.

The described arrangement of valve has many advantages, by having its axis of rotation eccentric to the center of pressure of the water in the conduit, dead centers are avoided, the valve being at all times under the influence of the pressure of the water therein whatever its position may be. Furthermore, it is extremely sensitive to pressure variations, and renders it possible to readily regulate the pressure in front or on the outlet side of the valve relatively to the pressure behind or on the inlet side of said valve, according to the power or velocity required, while the valve will perform its function in an open conduit as well as in a closed conduit, which is not the case with any regulating valve known to me.

Having thus described my invention, what I claim as new therein, and desire to secure by Letters Patent, is—

1. The combination with an open or closed water way or conduit, and an eccentric throttle valve pivoted within the way or conduit eccentrically relatively to the center of pressure of the water therein, of means for varying the position of the valve whereby the pressure on opposite sides of the valve is correspondingly varied, for the purposes set forth.

2. The combination with an open or closed water way or conduit, of an eccentric throttle valve pivoted within the waterway or conduit eccentrically relatively to the center of pressure of the water therein, and an actuating piston controlled by variable pressures, connected with the valve, for the purpose set forth.

3. The combination with an open or closed water way or conduit and an eccentric throttle valve pivoted within the way or conduit eccentrically relatively to the center of pressure of the water therein, of a fluid controlled piston connected with the valve portion of greater area, and means for controlling the pressure of the fluid within the piston cylinder, for the purpose set forth.

4. The combination with an open or closed water way or conduit, an eccentric throttle valve pivoted within the water way or conduit eccentrically relatively to the center of pressure of the water in said way or conduit, a piston cylinder E, and a piston F therein connected with the valve portion of greater area; of a pressure regulating device consisting of a cylinder P, connected by pipe with the cylinder E, a fluid inlet and outlet for said cylinder P, and co-operating with the fluid inlet and outlet to vary their relative sectional areas, whereby a corresponding variation of the pressure within said cylinders P and E is produced, for the purpose set forth.

5. The combination with an open or closed water way or conduit, an eccentric throttle valve pivoted within the water way or conduit eccentrically relatively to the center of pressure of the water in said way or conduit, a piston cylinder E, and a piston F therein connected with said valve or valves; of a pressure regulating device consisting of a cylinder P, connected by pipe with the cylinder E, means substantially such as described for varying the sectional area of said pipe, a fluid inlet and outlet for said cylinder P, and twin equilibrated pistons o and o', working in cylinder P and co-operating with the fluid inlet and outlet to vary their relative sectional areas whereby a corresponding variation in the pressure within said cylinders P and E is produced, for the purpose set forth.

6. The combination with an open or closed water way or conduit, of an eccentric throttle valve and a pressure controlled regulating device connected therewith, said valve having its axis of rotation within the water way or conduit and its point of connection with the regulating device on opposite sides of the center of pressure of the water in said way or conduit, for the purpose set forth.

In testimony whereof I affix my signature in presence of two witnesses.

JOHANN LAURENZ FURIAKOVICS.

Witnesses:
W. B. MURPHY,
VICTOR KARMIG.